G. A. WHEELER, DEC'D.
H. M. WHEELER, ADMINISTRATOR.
MOVING STAIRWAY.
APPLICATION FILED APR. 24, 1911. RENEWED FEB. 11, 1913.
1,130,556.
Patented Mar. 2, 1915.
5 SHEETS—SHEET 1.
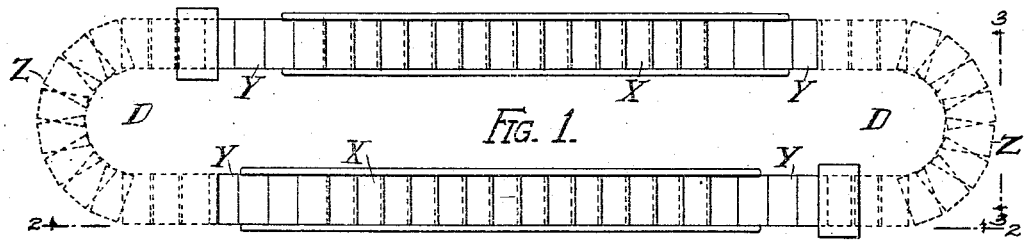
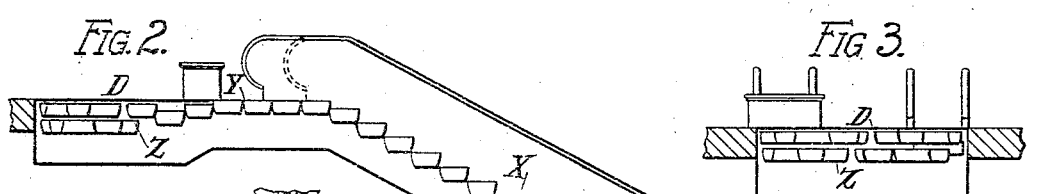
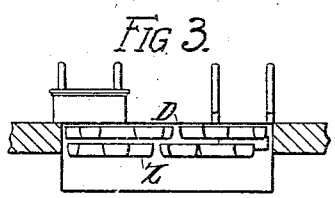
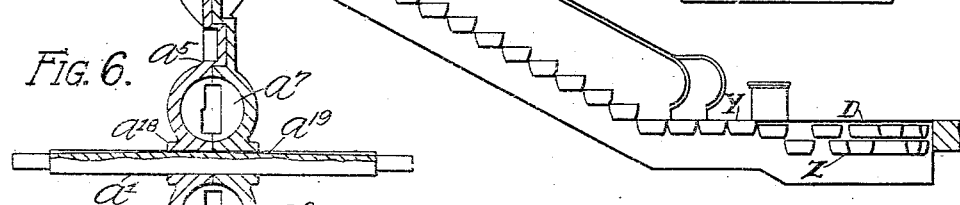
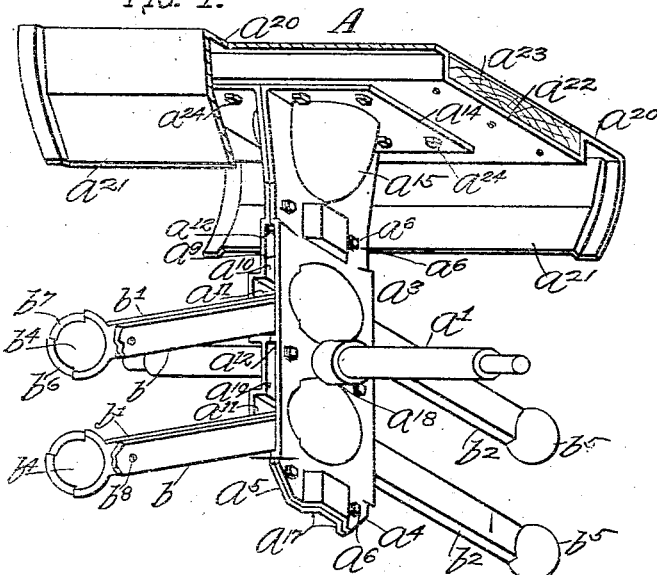
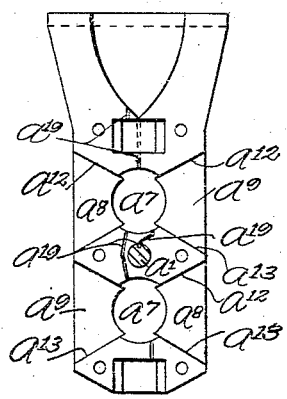
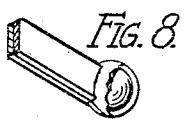
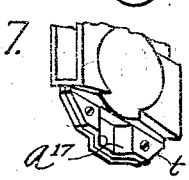

G. A. WHEELER, DEC'D.
H. M. WHEELER, ADMINISTRATOR.
MOVING STAIRWAY.
APPLICATION FILED APR. 24, 1911. RENEWED FEB. 11, 1913.
1,130,556.
Patented Mar. 2, 1915.
5 SHEETS—SHEET 2.
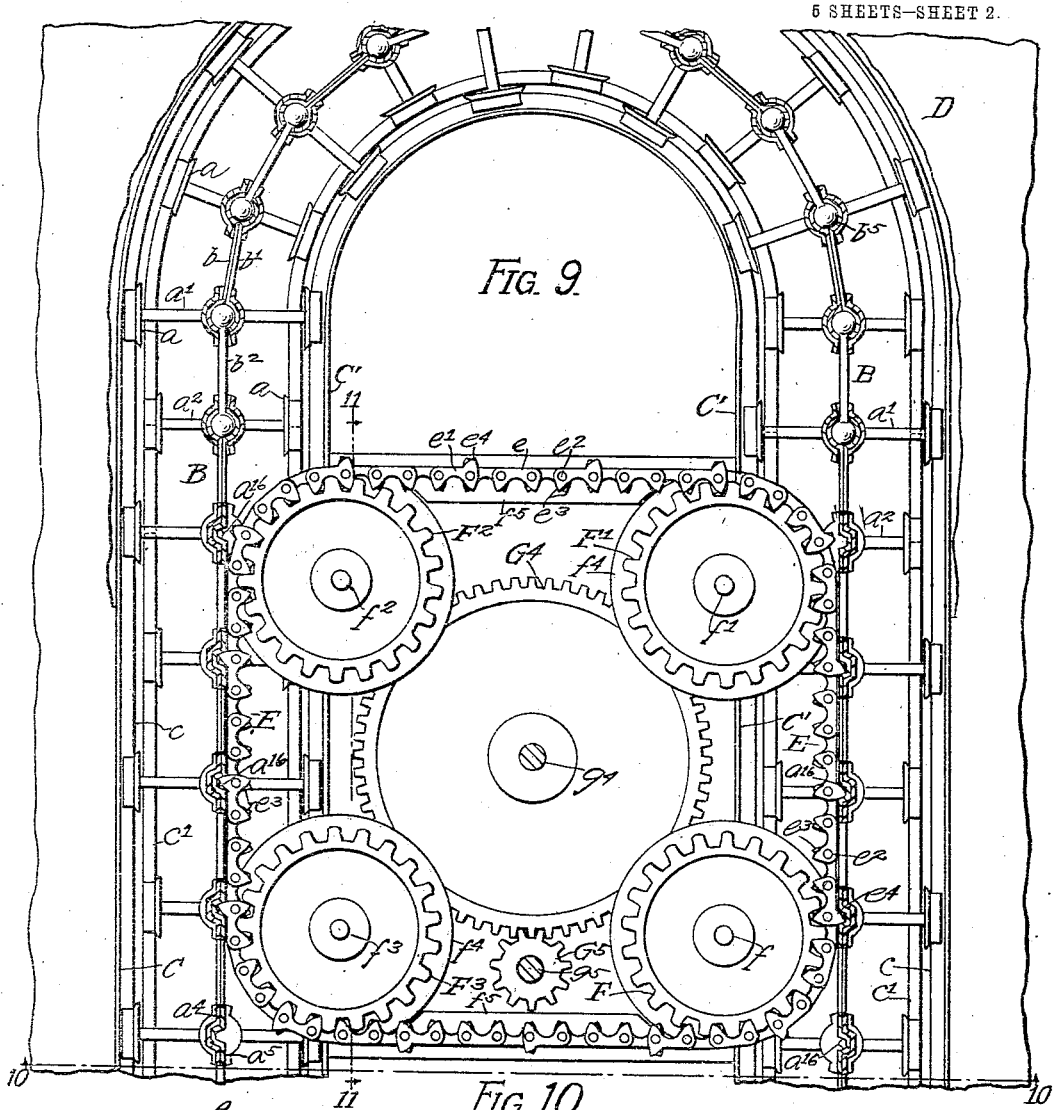
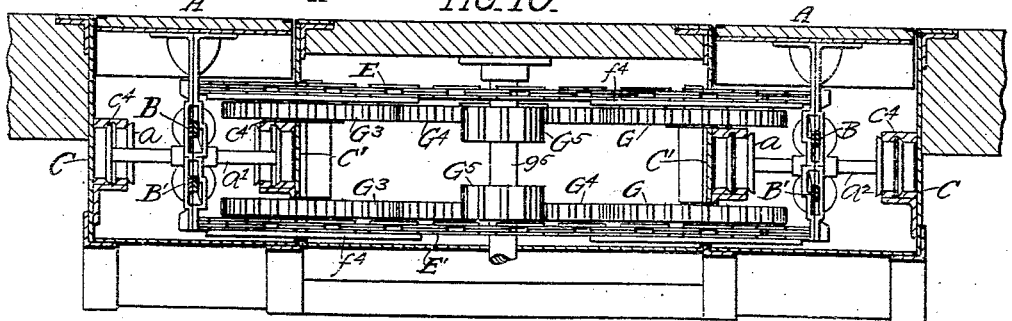
Witnesses:
Inventor:

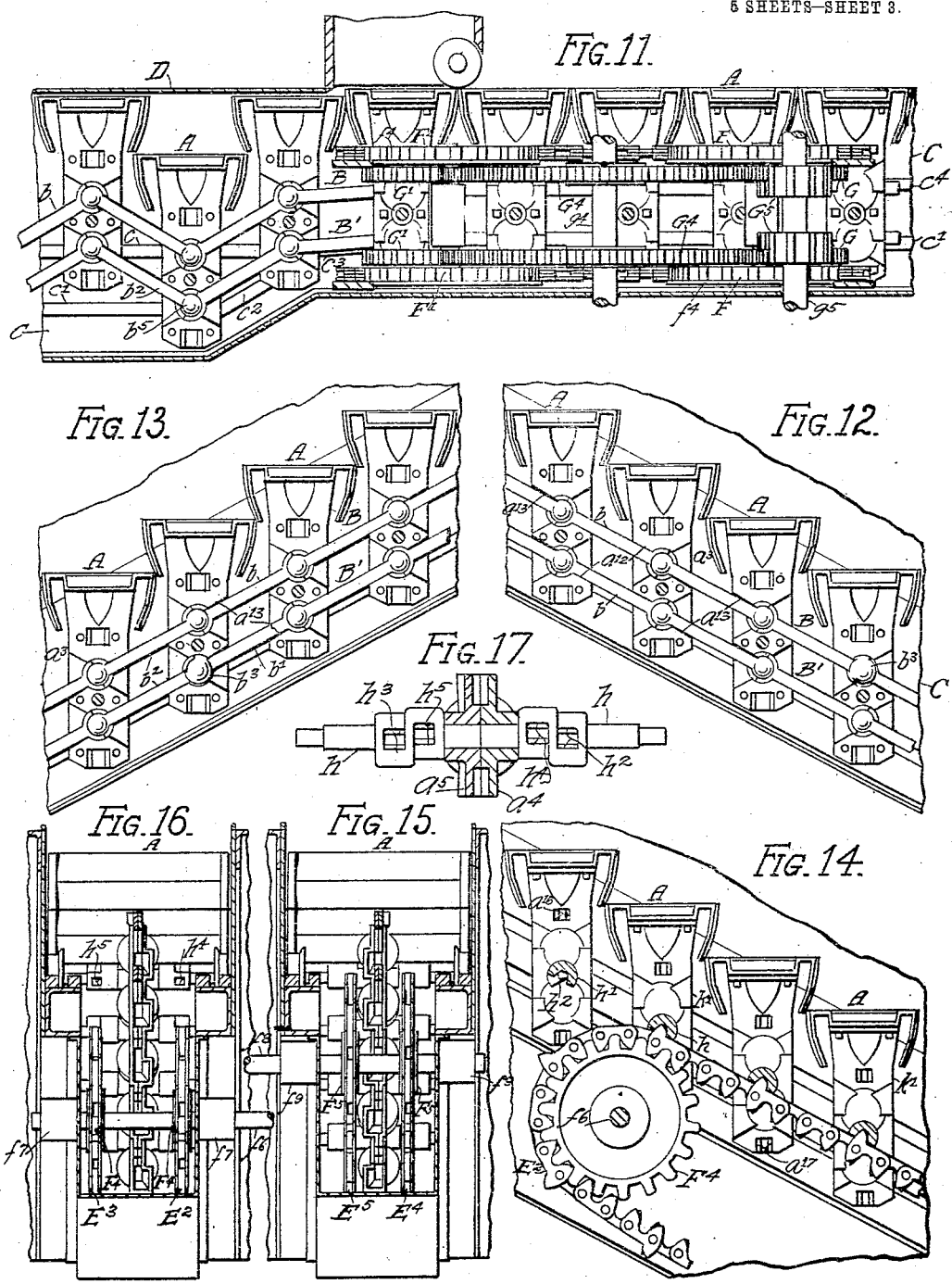

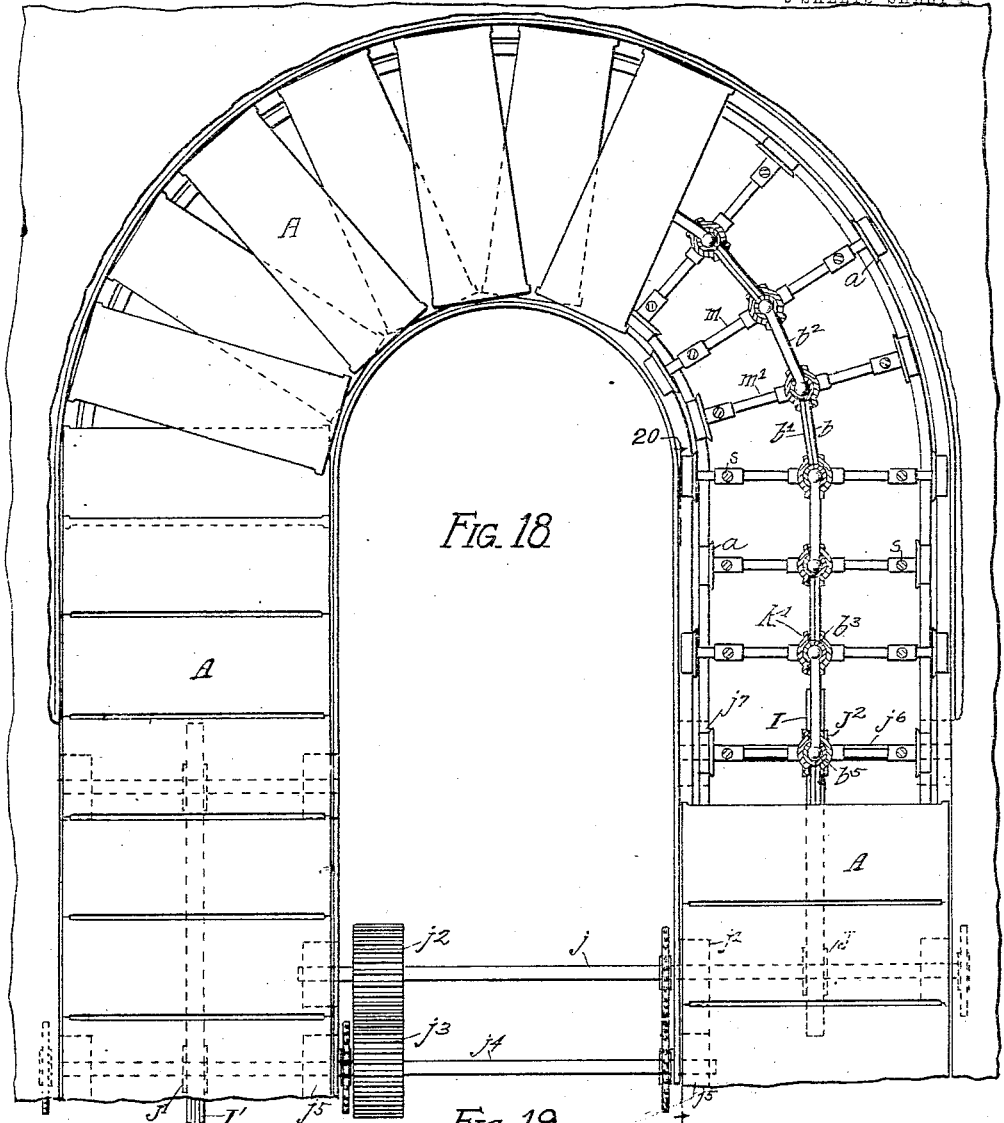

G. A. WHEELER, DEC'D.
H. M. WHEELER, ADMINISTRATOR.
MOVING STAIRWAY.
APPLICATION FILED APR. 24, 1911. RENEWED FEB. 11, 1913.
1,130,556.
Patented Mar. 2, 1915.
5 SHEETS—SHEET 5.
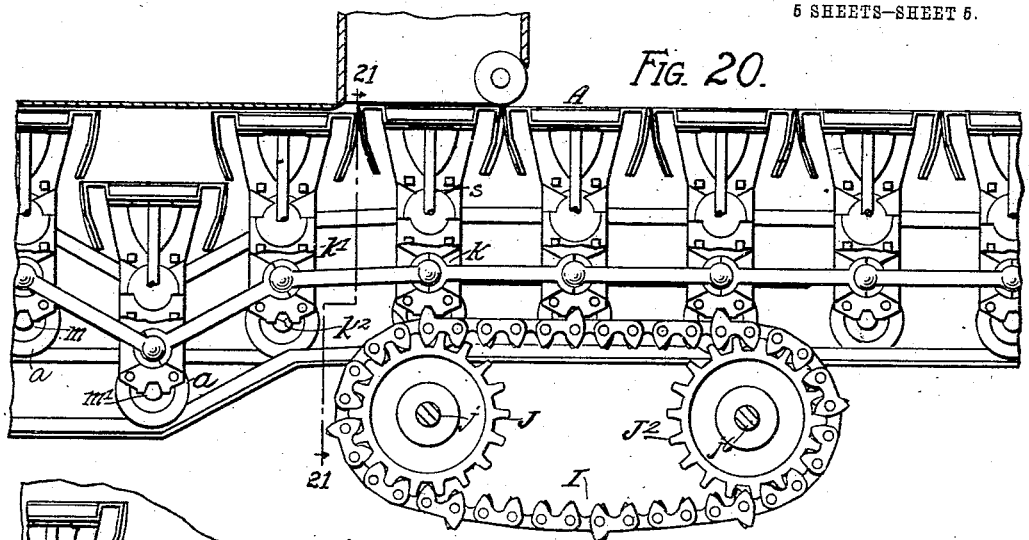
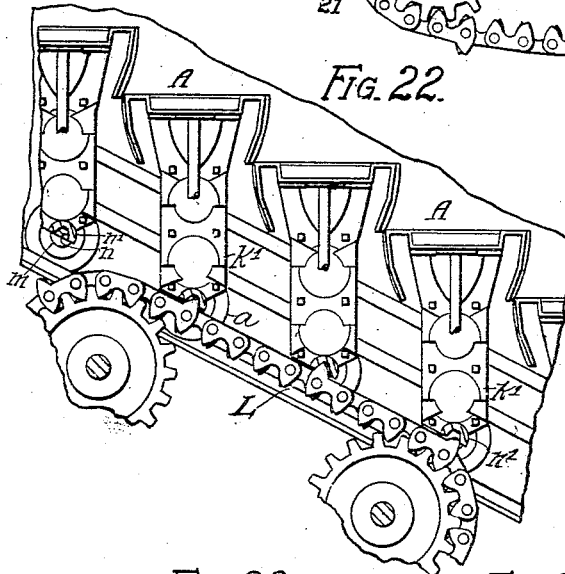
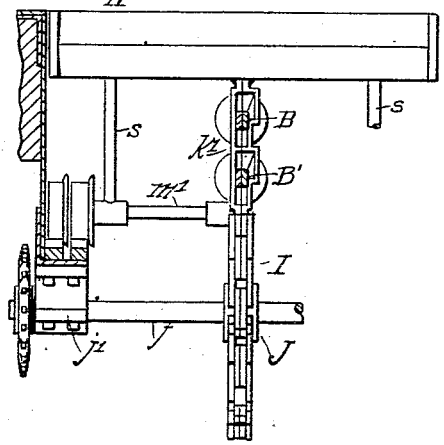
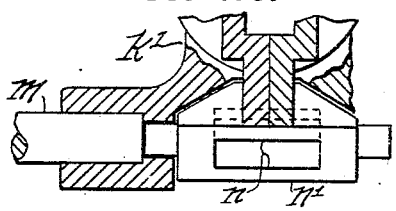
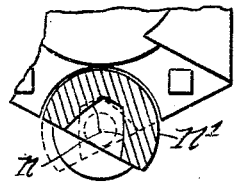
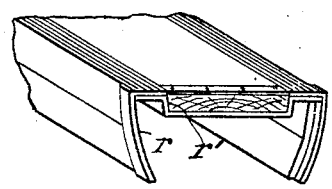
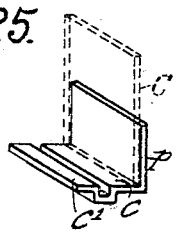
Witnesses:
George Sturratt.
John H. Keelley.
Inventor:
Geo. A. Wheeler

UNITED STATES PATENT OFFICE.

GEORGE A. WHEELER, OF NEW YORK, N. Y.; H. M. WHEELER ADMINISTRATOR OF SAID GEORGE A. WHEELER, DECEASED.

MOVING STAIRWAY.

1,130,556. Specification of Letters Patent. Patented Mar. 2, 1915.

Application filed April 24, 1911, Serial No. 623,089. Renewed February 11, 1913. Serial No. 747,796.

*To all whom it may concern:*

Be it known that I, GEORGE A. WHEELER, a citizen of the United States, residing in the borough of Brooklyn, Kings county, in the city and State of New York, have invented new and useful Improvements in Moving Stairways, of which the following is a specification.

My invention relates to certain improvements in mechanism described and claimed in my U. S. patent application, filed November 16, 1909, Serial Number 528,426, one object of the present invention being to simplify and cheapen the construction of the linkage, carriages and their guides.

Another object is to reduce friction between the moving parts.

A further object is to provide an improved drive for the machine.

These and other advantageous ends I secure by the constructions hereinafter set forth, reference being had to the acompanying drawings in which—

Figure 1 is a plan, to some extent diagrammatic, of a moving stairway constructed in accordance with my invention; Fig. 2 is a diagrammatic vertical section on line 2—2 of the stairway illustrated in Fig. 1; Fig. 3 is a diagrammatic vertical section on line 3—3, Fig. 1; Fig. 4 is an isometric view of one of the carriages or steps; Fig. 5 is a face view of one of the members forming the standards of the carriages; Fig. 6 is a vertical section through a standard taken parallel with an axle; Figs. 7 and 8 are details illustrating modified forms of construction; Fig. 9 is a plan view of an upper landing and loop with the treads of the steps or carriages and the adjacent floor removed; Fig. 10 is a vertical sectional view of Fig. 9 on line 10—10; Fig. 11 is a vertical sectional view of Fig. 9 on line 11—11; Figs. 12 and 13 illustrate the position of the carriages on the ascending and descending flights; Figs. 14, 15 and 16 illustrate a supplementary or modified form of drive of which Fig. 17 is a detail; Figs. 18 and 19 are views similar to Figs. 9 and 10 respectively, and illustrate a modified form of carriage and drive; Fig. 20 is a vertical section on line 20—20 of Fig. 18; and Fig. 21 is a vertical section on line 21—21 of Fig. 20; Fig. 22 illustrates a modified form of drive of which Figs. 23 and 24 are details; Fig. 25 illustrates a modified track construction, and Fig. 26 illustrates an alternative method of constructing the tread portion of a carriage or step.

Referring first to Figs. 1, 2, 3, 4, 5, 6, 9, 10, and 11, of the above drawings, which show one embodiment, preferred for the purposes of illustration, my improved stairway consists of a series of carriages or steps A, each mounted upon a pair of anti-friction devices or wheels $a$, journaled alternately upon two sets of axles $a^1$ and $a^2$ which differ only in length, the axles $a^1$ being enough longer than the axles $a^2$ so that the anti-friction devices or wheels $a$ on the former do not track with those on the latter; otherwise all of the carriages or steps A are similar.

Supported by the axle $a^1$ or $a^2$ of each carriage is a centrally located standard $a^3$ formed of two members $a^4$ and $a^5$ vertically jointed and secured together in any suitable manner as by the bolts $a^6$. The members $a^4$ and $a^5$ are each provided, on their meeting faces, with registering recesses which together form two spherical sockets or bearings $a^7$ and also openings $a^8$ leading from opposite sides of the bearings $a^7$. One vertical wall $a^9$, of the openings $a^8$, is at right angles to the axles $a^1$ and $a^2$ and, in my improved construction, the opposite vertical wall is also at right angles to the axles for a part $a^{10}$ of its height, and the remaining part $a^{11}$ is splayed off at an obtuse angle with the axles.

In the carriages having the long axles $a^1$, the part $a^{11}$ is below the part $a^{10}$; and, in the carriages having the short axles $a^2$, the part $a^{11}$ is above the part $a^{10}$; The upper and lower walls of the openings $a^8$ are also flared outwardly, the upper walls $a^{12}$ of the openings of the carriages having the axles $a^1$ are inclined at one angle, and the lower walls of the openings $a^8$ of the carriages having the axles $a^2$ are inclined at the same angle or slant $a^{12}$. The lower walls of the openings $a^8$ of the carriages having the axles $a^1$ and the upper walls of the openings of the carriages having the axles $a^2$ have likewise the same angle or slant which is slightly steeper than $a^{12}$ and is designated $a^{13}$. The several walls, or parts thereof, $a^9$, $a^{10}$, $a^{11}$, $a^{12}$ and $a^{13}$, form stops which operate in the manner described farther on.

The members $a^4$ and $a^5$ are extended upwardly and terminate in the flanges $a^{14}$ which may be stiffened by hollow bosses $a^{15}$, or by suitable ribs. Each standard, moreover, is provided with sets of oppositely placed abutments $a^{16}$ and $a^{17}$ for engagement with the lugs of drive chains hereinafter described. In the present instance, there are two sets of these abutments spaced apart vertically, preferably by being located equidistant, above and below, the axles $a^1$ and $a^2$, although the essential principal is their vertical separation. In some cases I may form these sets of abutments, $a^{16}$ and $a^{17}$, of separate pieces $t$ suitably fastened to the standards, as is shown in Fig. 7. The standard $a^3$ may be attached to the axles $a^1$ and $a^2$ by passing the latter through the hubs $a^{18}$ formed on or bolted to the members $a^4$ and $a^5$ and be held in place by a driving fit or other well known means, as illustrated in Figs. 4, 5 and 6. I preferably provide the oil ducts $a^{19}$, leading to and connecting the bearings $a^7$ and also leading to the ends of the axles, as is clearly shown in Figs. 5 and 6. Thus lubricant, introduced through a hole in the treads of the carriages, located centrally over the standards $a^3$, may be supplied directly, or through a suitable oil cup, to all the bearings of the carriages A.

The standard members $a^4$ and $a^5$ may be metal forgings or stampings being invented with a view to such processes of manufacture. Each carriage or step A, moreover, comprises a tread having a riser along each of its longitudinal edges, and is preferably formed, as is clearly shown in Fig. 4, of a sheet metal stamping or of a rolling in one piece, forming the longitudinal edges $a^{20}$ of the tread with integral depending risers $a^{21}$, and with a central portion $a^{22}$, preferably extending the entire length of the tread, sunken or depressed, which serves to give the tread the necessary stiffness. The risers $a^{21}$ are stamped or bent, preferably in a manner shown in Fig. 4 and described in my pending application, referred to in the second paragraph of this specification, which stamping or bending alone I depend upon, in my improved construction, to give the risers $a^{21}$ the requisite stiffness. In some cases I may stiffen the risers by making them convex, such a shape being well adapted to clear the forming tools or rolls. The sunken portion $a^{22}$ is filled in, preferably with a wooden member $a^{23}$, bringing the level of the central portion of the tread flush with the longitudinal edges $a^{20}$. The member $a^{23}$ may be attached by screws inserted through from the underside of the portion $a^{22}$.

It will be observed that the above described one-piece tread construction, besides being light in weight, affords great stiffness. The tread, with the depending risers above described, is placed centrally over the standard $a^3$ and secured to the latter by bolts $a^{24}$ passed through holes in the sunken portion $a^{22}$ and the flanges $a^{14}$.

The series of carriages or steps A, in my improved machine, instead of being connected together by parallel links, as in all parallel linkage systems heretofore devised, so far as I am aware, are pivoted to two continuous parallel chains B and B' which are of equal and constant length.

The chains B and B' are formed of rigid links $b$, $b^1$ and $b^2$, the links $b$ and $b^1$ being arranged in pairs and terminating at either end in registering hollow half spheres which together form balls $b^3$ and spherical sockets or bearings $b^4$. The links $b^2$, which are of the same pitch length as the links $b$ and $b^1$, also terminate at either end in balls $b^5$ which are journaled in the spherical bearings $b^4$, the half spheres of the links $b$ and $b^1$ being cut away at $b^6$, and the links $b^1$ being notched at $b^7$, to provide clearance for the links $b^2$ and their necessary vertical and lateral swing. In some cases I may form the links $b^2$ of two members, similar to $b$ and $b^1$, as is illustrated by Fig. 8, and where stampings are used I may reinforce them by placing balls between their ends. The links $b$ and $b^1$ may be connected by screws $b^8$. To the two continuous chains B and B' thus formed are pivoted the carriages A, by journaling each of their two socket bearings $a^7$ on adjacent balls $b^3$ of the chains, the links of which pass through the openings $a^8$, thus holding the chains in vertical parallelism and permitting of relative movement of the parts, in both vertical and horizontal planes, between the limits or stops $a^9$, $a^{10}$, $a^{11}$, $a^{12}$ and $a^{13}$, which stops allow of sufficient freedom of movement to enable the two chains, with the carriages attached, to traverse all portions of the guideway next to be described. The cutaway portions $b^6$ and $b^7$, of the balls $b^3$, permit a lubricant, entering through the ducts $a^{19}$, to reach the bearings $b^4$, and may be supplemented by holes drilled in the balls $b^3$ in line with the ducts $a^{19}$. It will be noted that, in the described arrangement, the chains B and B' are independent of the carriages A, which are free to move on the balls $b^3$ without being affected by the tension in the chains B and B', thereby greatly reducing friction.

The guideway for the jointed traveling structure, as noted in the application referred to in the second paragraph of this specification, and as is clearly illustrated in Figs. 1, 2, 3, 9, 10, 11, 12 and 13, comprises ascending and descending carrying runs upon which the carriages or steps form flights X, and preferably, at top and bottom of the flights, horizontal carrying runs on which the carriages form landings Y, and laterally curved runs or loops Z, connecting the carrying runs into an endless guideway which may be of any convenient type or arrangement, or one determined by the location. As noted in said application, the strings or framework for the support of the tracks of the guideway consists preferably of two built-up channels C and C', Figs. 9, 10, 11 and 12, supported in any usual or suitable way. There are two rails $c$ and $c^1$ attached to each channel, and located in such relative vertical planes as to engage with the wheels of the long and short axles $a^1$ and $a^2$ respectively, of the two series of axles. On the flights X, the treads of the rails $c$ and $c^1$ are in a single plane of such inclination that the carriages are retained with their end edges in contact and with the sides of the links $b$, $b^1$ and $b^1$ in contact with the side walls $a^9$ and $a^{10}$ of the openings $a^8$ in the standards $a^3$; and with the upper and lower walls $a^{12}$ in contact with the upper and lower edges, respectively, of the adjacent links $b$, $b^1$ and $b^2$, thus locking the individual carriages in alinement both laterally and vertically, as is clearly shown in Figs. 12 and 13. Similarly on the landings Y, the carriages A are locked against lateral displacement by the contact of their end edges and of the vertical walls $a^9$ and $a^{10}$ respectively, with the opposite sides of the links $b$, $b^1$ and $b^2$; and also against vertical displacement by the parallel chains B and B', Figs. 10 and 11. As noted in the said application in order to permit of rigid rectangular carriages like A passing around the loops Z, it is necessary for them to lap each other obliquely and the rails $c$ and $c^1$ are located in two such relative horizontal planes that adjacent carriages overlap and underlap each other respectively, as is clearly shown in Figs. 9 and 18, the rails $c^1$, with which the wheels of the carriages having the short axles $a^2$ engage, being inclined downwardly, before the loop is reached, by sections of rail $c^2$ sufficiently long and enough steeper than on the flights X, to cause the carriages with the axles $a^2$ to take relative positions in which they are below and clear of the carriages having the axles $a^1$ whose rails $c$, in my present improved form of loop, are also slightly inclined downwardly by short sections of rail $c^3$ of sufficient inclination to permit of a floor or platform D, adjoining a loop Z, to be extended over the loop without raising its level, the sections of the rails $c^3$, as well as $c^2$, being duplicated on the opposite side of the loop; and these sections of rails are so placed, on opposite sides of the loops, that the movement of the chains B and B', with relation to the track, on one side, exactly compensates for the movement on the other side of the loop Z, so that the tension of the chains is not affected. Thus the carriages pass under and emerge from under a floor or platform D of the same level as the landings Y; and, in order to permit of the described overlapping and underlapping of the carriages with the long axles $a^1$ and the short axles $a^2$ respectively, in my improved construction, only the parts $a^{11}$ of the side walls of the openings $a^8$ are splayed to permit of the carriages, while lapped, maintaining radial positions while passing around the loops Z, leaving the parts $a^{10}$ of these side walls at right angles to the axles $a^1$ and $a^2$ so as to contact with the sides of the links $b$, $b^1$ and $b^2$ on the carrying runs X and Y, and coöperate with the side walls $a^9$ to positively lock the carriages against lateral displacement; while the lower and upper walls $a^{13}$ of the openings $a^8$ of the carriages having the long axles $a^1$ and the short axles $a^2$ respectively, which are slightly out of contact with the lower and upper edges, respectively, of the links $b$, $b^1$ and $b^2$ on the flights X, are in contact with these edges on the loops Z and lock the carriages against vertical displacement, as is clearly shown in Figs. 10 and 11. It will be noted that the stops $a^9$, $a^{10}$, $a^{11}$, $a^{12}$ and $a^{13}$, without being closely fitted, will yet serve to instantly check any tendency of the carriages to get out of alinement.

In order to hold the wheels $a$ to their rails, I may provide guard rails at any points throughout the guideway, as for instance the guard rails $c^4$, Figs. 10 and 11, which serve to counteract any thrust exerted by the driving mechanism next to be described. For the purpose of driving the endless belt of carriages, I preferably provide the two similar drive chains E and E', Figs. 9, 10 and 11, running over the chain wheels F, $F^1$, $F^2$ and $F^3$, mounted on the vertical shafts $f$, $f^1$, $f^2$ and $f^3$ on which, in the present instance, are also mounted the gears G, $G^1$, $G^2$ and $G^3$ meshing with the gears $G^4$ on the shaft $g^4$ and driven by the pinions $G^5$ on a shaft $g^5$ and actuated from any suitable source of power, preferably an electric motor located in a suitable housing, underneath or adjacent to the drive. The channels C' are mortised to provide clearance for the chains, chain and gear wheels, and it will be understood that the various shafts are provided with suitable journal bearings. The chains E and E' ride on the flanges $f^4$ secured to the under sides of the chain wheels F, $F^1$, $F^2$ and $F^3$ and, in the present instance, slide on the chain rails $f^5$. In some cases I may omit the gears $G^1$, $G^2$ and $G^3$ and mount the pinions $G^5$ in mesh with the gears G.

Each of the chains E and E' has its pitch adapted to the length, from center of ball to center of ball, of the links $b$, $b^1$ and $b^2$, of the chains B and B', and is built up of two patterns of links $e$ and $e^1$, pivoted together in the usual manner with the pins $e^2$. Both the links $e$ and $e^1$ are provided with lugs $e^3$, on one side of the chain, for engagement with the similar chain wheels F, $F^1$ $F^2$ and $F^3$, and the links $e^1$ are provided with additional lugs $e^4$ on the opposite side of the chains for engagement with the sets of abutments, $a^{16}$ and $a^{17}$, on the carriages A, as is clearly shown in Fig. 9, from which figure it will be seen that the lugs $e^4$ are adapted to co-act through the movement of the chains E and E' and that, while passing over the chain wheels F and $F^2$ to be brought into engagement with the abutments, they are folded together and, after they have been brought into engagement, the lugs $a^4$ unfold through the straightening of the chains and wedge between the opposed abutments of each set, $a^{16}$ and $a^{17}$, thus locking the chains E and E' in positive engagement with the carriages A until released by the lugs again being folded together as the joints in the chains move in passing over the chain wheels $F^1$ and $F^3$. The lugs $e^3$, on the opposite side of the chains, are of the Renold pattern and operate in a well known manner. In some cases I may omit the lugs $e^3$ and engage the spaces between the links by teeth of sprockets, or actuate the chains E and E' by other devices in common use.

It will be noted that, by the above described folding of the lugs, the friction between the lugs of the drive chains and the carriages is measurably reduced. The drive chains E and E', in the present instance, are separate from each other and travel at the same speed, simultaneously engaging the carriages A at points thereon equidistant, above and below, their axes or axles $a^1$ and $a^2$, as is clearly shown in Figs. 10 and 11, and thus have no tendency to tilt the treads of the carriages from the horizontal but, on the contrary, coöperate with the means hereinbefore described to hold the treads of the carriages rigidly horizontal.

In some cases I may locate the sets of abutments, $a^{16}$ and $a^{17}$, both above or both below the axles $a^1$ and $a^2$, and in other cases, I may connect the chains E and E' into one relatively wide chain by substituting for the separate pins $e^2$, pins long enough to be common to both chains, the essential principle being the vertical separation of the sets of abutments and the engaging lugs. In the present instance, it will be noted that the chains E and E' engage the standards $a^3$ equidistant above and below the wheels $a$ whose flanges engage the rails $c$ and $c^1$, and the guard rails $c^4$, and thus overcome any slight thrust of the drive chains, although such thrust is reduced to the minimum by the lugs $e^4$ being folded together when they enter the spaces between the abutments, $a^{16}$ and $a^{17}$, and by being wedged between the abutments of a plurality of carriages at all times.

The drive above described is preferably located, as is clearly shown in Figs. 9 and 11, under an upper landing Y and adjacent to a loop Z, which location permits of the setting of the drive so that the pull of the descending load is taken off of the loop and transmitted, through the chains E and E', and any connecting gearing, to the ascending run where it is utilized in raising the ascending load, leaving the portions of the chains B and B' on the loops Z practically free from tension. I may provide a similar drive for the foot of the stairway and for landings intermediate of the flights, where such landings occur. I may also supplement the above described drive by a drive like that illustrated in Figs. 14, 15, 16 and 17. In this case the carriages A are provided with axles $h$ and $h^1$, instead of the axles $a^1$ and $a^2$, and carry four sets of facing abutments $h^2$, $h^3$, $h^4$ and $h^5$, two sets, $h^2$ and $h^3$, being spaced equidistant on each side of the standards $a^3$, with two drive chains $E^2$ and $E^3$ mounted under an ascending run, on driving chain wheels $F^4$, carried by the shaft $f^6$, journaled in the bearings $f^7$; and the other sets of abutments $h^4$ and $h^5$, which are also equidistant on each side of the standards $a^3$, but inside of the other sets of abutments, are engaged by two other drive chains, $E^4$ and $E^5$, mounted under a descending run, on driving chain wheels $F^5$, carried by a shaft $f^8$, journaled in the bearings $f^9$. There are driven chain wheels for each chain mounted on idler shafts, and the shafts $f^6$ and $f^8$ preferably reach across from one run to the other and are connected by gears in a manner similar to that illustrated in Figs. 18 and 22.

In Figs. 18, 19, 20 and 21 are shown modifications of the drive and also of the carriage construction. The drive chain I is mounted under a landing, on an ascending run, upon the driving chain wheel J, carried by the horizontal shaft $j$, journaled in the bearings $j^1$ and carrying a gear $j^2$, meshing with a gear $j^3$, carried by a shaft $j^4$, journaled in bearings $j^5$ and reaching across under a descending landing where it carries the similar drive chain I', running over the driving chain wheel $J^1$. The chain I also runs over the driven chain wheel $J^2$, carried by an idler shaft $j^6$, journaled in bearings $j^7$ and is duplicated, under the other run, for the chain I'. In the present instance, the bearings $k$ in the standards $k^1$ are located both above the axles $m$ and $m^1$, and the single set of abutments $k^2$, on the standards $k^1$, is on a line with the axles, so that the lugs of the drive chains I and I' have no tendency to tilt the carriages from the horizontal. These figures also illustrate means, supplemental to the standards $k^1$, for supporting the treads of the carriages A, which means comprises vertical struts $s$ extending from the axles $m$ and $m^1$ to the depressed portion $c^{22}$ of the tread and are secured to each in any suitable way.

Figs. 22, 23 and 24 illustrate a method of driving in which the sets of abutments $n$ are on a separate member $n^1$, pivoted to the standards $h^1$, on a line with the axles $m$ and $m^1$, and are adapted to be tripped and swung so as to be engaged by lugs of the drive chain L, on both the ascending and descending runs, the general arrangement of chain wheels, gears and shafting being similar to that shown in Figs. 18 and 19.

Fig. 25 illustrates a modification of the track in which both rails $c$ and $c^1$, and a flange $p$ for stiffening and attaching to a string or channel C, are formed in one metal section adapted for rolling.

Fig. 26 illustrates, instead of the integral tread and riser construction hereinbefore described, a method of constructing the risers of a separate stamping or rolling $r$ suitably fastened to the tread $r'$.

Although I have shown and described suitable methods of constructing and arranging my invention, I do not limit myself to the specific constructions or arrangements illustrated and described, since the scope of my invention embraces sundry modifications that the illustrations and descriptions suggest.

What I claim is—

1. In a device of the class described, continuous vertically parallel chains of constant length to which carriages are pivoted, substantially as described.

2. In a device of the class described, two continuous chains with carriages pivoted to the chains at points on the carriages equidistant, above and below their axes or axles, substantially as described.

3. In a device of the class described, two continuous chains pivoted to the carriages so as to be held in vertical parallelism, substantially as described.

4. In a device of the class described, two continuous independent chains with carriages pivoted to said chains at points equidistant, one over the other, on said carriages, substantially as described.

5. In a device of the class described, the combination with a series of carriages and an endless guideway including laterally curved portions, of a continuous endless chain to which the carriages are pivoted, substantially as described.

6. In a device of the class described, the combination with a series of carriages and a guideway therefor comprising horizontal and inclined portions, and laterally curved portions, of two continuous parallel chains to which the carriages are pivoted, substantially as described.

7. In a device of the class described, a central standard supporting the tread of a carriage and consisting of two vertically disposed forgings or stampings bolted together with bearings and stops for links forged or stamped therein, substantially as described.

8. In a device of the class described, a series of chain connected carriages, each provided with a central standard consisting of two suitably connected members vertically jointed together, each member being provided with registering recesses forming together two spherical bearings for balls on said chains and also stops to limit the movement of said chains, substantially as described.

9. In a carriage for a device of the class described, a standard consisting of two members vertically jointed together and provided with a socket for a link bearing, substantially as described.

10. In a device of the class described, a chain for connecting the carriages, said chain comprising two series of links terminating in balls, the ball terminals of one series of links being journaled in sockets formed in the ball terminals of the other series of links, substantially as described.

11. In a device of the class described, a chain for connecting the carriages and comprising two series of rigid links with balls at or near their ends, the balls of one series of links being journaled alternately in sockets formed in the balls of the other series of links, substantially as described.

12. In a device of the class described, comprising laterally curved guides, the combination with a series of carriages of a chain composed of two series of links terminating in balls, for connecting the carriages, the balls of one series of links being journaled in sockets formed in the balls of the other series of links, with the said latter balls journaled in sockets on the carriages, substantially as described.

13. In a device of the class described, a series of carriages provided with standards having abutments facing each other and adapted to be engaged by lugs of a drive chain, substantially as described.

14. In a device of the class described, a series of carriages provided with a plurality of sets of oppositely placed abutments vertically separated on said carriages and adapted to be simultaneously engaged by lugs of drive chains, substantially as described.

15. In a device of the class described, a carriage supported upon a central standard having vertically separated abutments adapted to be positively engaged simultaneously by driving mechanism, substantially as described.

16. In a device of the class described, an endless series of articulated links forming a drive chain for the carriages, and having, on opposite sides, lugs adapted to co-act through the movement of the links, substantially as described.

17. In a device of the class described, chain mechanism for driving the carriages carrying lugs spaced apart vertically with abutments on the carriages spaced so as to be engaged by the lugs of the chain mechanism, substantially as described.

18. In a device of the class described, the combination with a series of carriages, of a separate drive chain provided with lugs adapted to co-act through the movement of the chain and to fold together on being brought into and out of engagement with the carriages and to unfold and wedge therein, substantially as described.

19. In a device of the class described, the combination with an endless series of carriages, of a series of links pivoted together to form a separate drive chain running over chain wheels, said chain being provided with lugs on opposite sides co-acting through the movement of the chain, the lugs on one side being adapted to be folded on entering or leaving the chain wheels and to unfold and wedge therein, and the lugs on the opposite side of the chain being adapted to be folded on being brought into and out of engagement with abutments on said carriages and to unfold and wedge therebetween, substantially as described.

20. In a device of the class described, the combination with a carriage supported upon a single pair of anti-friction devices, of a pair of drive chains mounted to engage said carriage at points vertically separated thereon, substantially as described.

21. In a device of the class described, the combination with a series of carriages, each provided with a central standard supported upon a pair of anti-friction devices, of driving mechanism mounted to engage said carriages at points thereon vertically separated, substantially as described.

22. In a device of the class described, the combination with an endless series of carriages, each supported upon a single pair of anti-friction devices and provided with opposed abutments for engaging the lugs of a drive chain, of a pair of drive chains mounted, one over the other, and carrying lugs for engaging said abutments on the carriages, substantially as described.

23. In a device of the class described, the combination with an endless series of carriages and guides therefor, of separate drive chain mechanism carrying lugs to engage vertically separated abutments on said carriages and located equidistant, above and below the axles of said carriages, substantially as described.

24. In a device of the class described, the combination with an endless series of carriages connected by parallel chains or links, each carriage being supported upon a pair of anti-friction devices, of two drive chains mounted to engage said carriages at points thereon vertically separated, substantially as described.

25. In a device of the class described, the combination with a series of carriages, of a plurality of drive chains mounted to engage said carriages at vertically separated points thereon and mechanism for driving said chains at the same speed, substantially as described.

26. In a device of the class described, the combination with an endless series of carriages and guides therefor including laterally curved loops, each carriage being supported at or near its end adjacent to the inner curves of the loops upon a single anti-friction device, of driving mechanism mounted to engage vertically separated abutments rigidly attached to said carriages, substantially as described.

27. In a device of the class described, the combination with an endless guideway including laterally curved portions and a series of carriages supported upon anti-friction devices, with a single such device supporting the inner ends of said carriages, of drive chain mechanism carrying vertically separated lugs mounted to simultaneously engage said carriages at points vertically separated thereon, and mechanism for driving said lugs at the same speed, substantially as described.

28. In a device of the class described, the combination with a series of carriages and guides therefor comprising ascending and descending runs, of driving mechanism carrying lugs mounted to simultaneously engage said carriages at points vertically separated thereon, on both of said runs, substantially as described.

29. In a device of the class described, the combination with a series of carriages and guides therefor comprising ascending and descending carrying runs, of drive chain mechanism extending from an ascending run to a descending run and carrying lugs mounted so as to positively engage said carriages on both of said runs at points vertically separated on said carriages, substantially as described.

30. In a device of the class described, the combination with a series of carriages and guides therefor comprising both an ascending run and a descending run, of separate drive chains for the carriages, the latter being provided with abutments for engagement with a drive chain on the ascending run and with different abutments for engagement with a drive chain on the descending run, substantially as described.

31. In a device of the class described, the combination with a series of carriages and guides therefor comprising both ascending and descending runs, of separate drive chains for the carriages, the latter being provided with movable abutments adapted to be swung into position to be engaged by the drive chains alternately upon the two runs, substantially as described.

32. In a device of the class described, the combination of a connected series of carriages forming an endless traveling structure, said structure being provided with oppositely facing abutments adapted for engagement with the lugs of a drive chain, and a drive chain provided with lugs and mounted to engage said abutments, substantially as described.

33. In a conveyer, consisting of a series of carriages or sections arranged in ascending and descending runs and connected to form an endless system, two separate drive chains running over chain wheels secured to shafts and mounted to engage said system on the ascending and descending runs respectively, spur gears connected respectively to a shaft of each drive chain and intermeshed so that one chain tends to drive the ascending run upward while the other chain tends to drive the descending run downward, substantially as described.

In testimony whereof, I have signed my name to this specification in the presence of two subscribing witnesses.

GEO. A. WHEELER.

Witnesses:
GEORGE STIRRATT,
JOHN H. KELLEY.

Copies of this patent may be obtained for five cents each, by addressing the "Commissioner of Patents, Washington, D. C."